US012395784B2

(12) United States Patent
Fathollahi

(10) Patent No.: US 12,395,784 B2
(45) Date of Patent: Aug. 19, 2025

(54) AUDIO SPEAKER

(71) Applicant: Nausser Fathollahi, Irvine, CA (US)

(72) Inventor: Nausser Fathollahi, Irvine, CA (US)

( * ) Notice: Subject to any disclaimer, the term of this patent is extended or adjusted under 35 U.S.C. 154(b) by 0 days.

(21) Appl. No.: 19/066,928

(22) Filed: Feb. 28, 2025

(65) Prior Publication Data

US 2025/0203272 A1 Jun. 19, 2025

Related U.S. Application Data

(60) Provisional application No. 63/559,699, filed on Feb. 29, 2024.

(51) Int. Cl.

| | |
|---|---|
| ***H04R 1/28*** | (2006.01) |
| ***H04R 1/02*** | (2006.01) |
| ***H04R 1/24*** | (2006.01) |
| ***H04R 7/04*** | (2006.01) |

(52) U.S. Cl.

CPC ........... *H04R 1/2803* (2013.01); *H04R 1/025* (2013.01); *H04R 1/028* (2013.01); *H04R 1/24* (2013.01); *H04R 7/045* (2013.01); *H04R 2307/023* (2013.01)

(58) Field of Classification Search

CPC ...... H04R 1/2803; H04R 1/025; H04R 1/028; H04R 1/24; H04R 7/045; H04R 2307/023

USPC ........................................................ 381/337

See application file for complete search history.

(56) References Cited

U.S. PATENT DOCUMENTS

| | | | | |
|---|---|---|---|---|
| 8,699,729 B2 | 4/2014 | Fathollahi | | |
| 10,805,736 B2 * | 10/2020 | Shin | B06B 1/0607 | |
| 11,671,750 B2 * | 6/2023 | Kim | H04R 3/12 | 381/333 |
| 11,678,124 B2 * | 6/2023 | Kim | H04R 17/00 | 381/333 |
| 11,747,905 B2 * | 9/2023 | Ham | H04R 1/028 | 381/333 |

FOREIGN PATENT DOCUMENTS

| | | | | |
|---|---|---|---|---|
| CN | 206993387 U * | 2/2018 | G02F 1/1333 |
| WO | WO-2019073401 A1 * | 4/2019 | |

* cited by examiner

*Primary Examiner* — Sean H Nguyen

(74) *Attorney, Agent, or Firm* — CIONCA IP Law P.C.

(57) ABSTRACT

Provided herein are high-fidelity, free-standing, wireless, glass speaker systems with a curved glass that is wide at the base and narrow on top, the width being gradually reduced all the way to the top, and having three slots at the top to reduce the mass of the glass. The shape of the glass is configured to create a dynamic range of sound, to allow low frequencies to resonate more prominently at the bottom, and high frequencies to be more prominent at the top of the glass, and the mid frequencies to resonate more prominently in the middle section of the glass.

20 Claims, 13 Drawing Sheets

AUDIO SPEAKER

CROSS-REFERENCE TO RELATED APPLICATIONS

This application claims the benefit of U.S. Provisional Application No. 63/559,699, filed Feb. 29, 2024, which is hereby incorporated by reference, to the extent that it is not conflicting with the present application.

BACKGROUND OF INVENTION

1. Field of the Invention

The invention relates generally to audio equipment, and more particularly, to speakers for high-fidelity sound.

2. Description of the Related Art

Generally, using glass or other hard surfaces to resonate audio can sound flat and hollow, and will not sound natural, and there is a lack of audio depth, particularly for vocal audio. This can occur when the sound is applied to a fabricated piece of glass using an audio transducer. Therefore, there is a need for a solution to the above problems.

The aspects or the problems and the associated solutions presented in this section could be or could have been pursued; they are not necessarily approaches that have been previously conceived or pursued. Therefore, unless otherwise indicated, it should not be assumed that any of the approaches presented in this section qualify as prior art merely by virtue of their presence in this section of the application.

BRIEF INVENTION SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

Provided herein is a high-fidelity, free-standing, wireless, glass speaker system with a curved glass that is wide at the base and narrow on top, the width being gradually reduced all the way to the top, and having three slots at the top to reduce the mass of the glass. The shape of the glass is configured to create a dynamic range of sound, to allow low frequencies to resonate more prominently at the bottom, and high frequencies to be more prominent at the top of the glass, and the mid frequencies to resonate more prominently in the middle section of the glass.

Generally, the speakers disclosed herein are provided with multiple transducers with different types of contact materials such as aluminum and copper. Audio EQ can be adjusted according to a set of four transducers, for example, wherein two transducers are copper and two transducers are aluminum. By using multiple transducers with different materials for the voice coil that makes contact with the glass of the speaker. This method of using two types of metal for contact with the glass will deliver a full frequency spectrum simultaneously, wherein the glass has a wide shape at the bottom and a narrow shape at the top, a dynamic audio range can be created.

Generally, the audio frequency responses are based on the fact that the mass of the glass per square cubic inch would physically impact the frequency response of audio as it resonates on the surface of the glass. Generally, higher glass mass=lower frequencies, and lower glass mass=higher frequencies. Since there is a gradual reduction of the mass horizontally going from the bottom to the top, the shape of the glass physically creates a dynamic range relative to the audio frequency responses that resonate on the surface of the glass on both sides.

Generally in conventional speakers, the audio frequencies cross each other from one side to the other side of the cone. The glass speakers provided within are configured such that the audio frequencies that resonate on the surface of the glass travel in a perpendicular manner from the surface of the glass. Thus, as the glass curves, the audio frequencies also travel according to the shape of the glass, creating a curved audio frequency path parallel to the shape of the glass, and therefore reflecting on other surfaces such as a wall, and audio frequencies traveling from the top part of the speaker reflects from the ceiling.

The above aspects or examples and advantages, as well as other aspects or examples and advantages, will become apparent from the ensuing description and accompanying drawings.

BRIEF DESCRIPTION OF THE DRAWINGS

For exemplification purposes, and not for limitation purposes, aspects, embodiments or examples of the invention are illustrated in the figures of the accompanying drawings, in which.

DETAILED DESCRIPTION

Figure 1B:
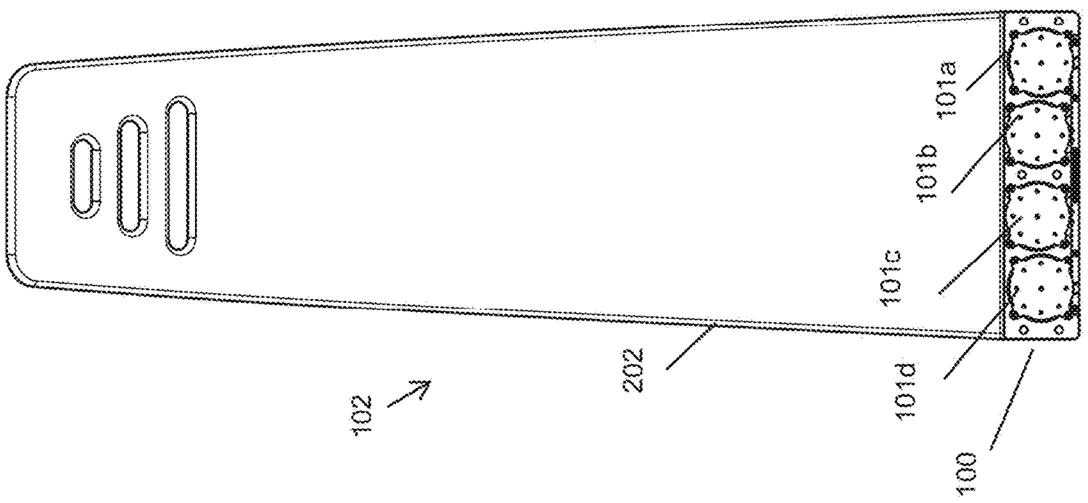
FIGS. 1A-1B depict a front view and a rear view, respectively, of a speaker assembly, according to an aspect.

What follows is a description of various aspects, embodiments and/or examples in which the invention may be practiced. Reference will be made to the attached drawings, and the information included in the drawings is part of this detailed description. The aspects, embodiments and/or examples described herein are presented for exemplification purposes, and not for limitation purposes. It should be understood that structural and/or logical modifications could be made by someone of ordinary skills in the art without departing from the scope of the invention. Therefore, the scope of the invention is defined by the accompanying claims and their equivalents.

It should be understood that, for clarity of the drawings and of the specification, some or all details about some structural components or steps that are known in the art are not shown or described if they are not necessary for the invention to be understood by one of ordinary skills in the art.

As used herein and throughout this disclosure, the term "mobile device" refers to any electronic device capable of communicating across a mobile network. A mobile device may have a processor, a memory, a transceiver, an input, and an output. Examples of such devices include cellular telephones, personal digital assistants (PDAs), portable computers, etc. The memory stores applications, software, or logic. Examples of processors are computer processors (processing units), microprocessors, digital signal processors, controllers and microcontrollers, etc. Examples of device memories that may comprise logic include RAM (random access memory), flash memories, ROMS (read-only memories), EPROMS (erasable programmable read-only memories), and EEPROMS (electrically erasable programmable read-only memories). A transceiver includes but is not limited to cellular, GPRS, Bluetooth, and Wi-Fi transceivers.

"Logic" as used herein and throughout this disclosure, refers to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

Mobile devices communicate with each other and with other elements via a network, for instance, a cellular network. A "network" can include broadband wide-area networks, local-area networks, and personal area networks. Communication across a network can be packet-based or use radio and frequency/amplitude modulations using appropriate analog-digital-analog converters and other elements. Examples of radio networks include GSM, CDMA, Wi-Fi and BLUETOOTH® networks, with communication being enabled by transceivers. A network typically includes a plurality of elements such as servers that host logic for performing tasks on the network. Servers may be placed at several logical points on the network. Servers may further be in communication with databases and can enable communication devices to access the contents of a database. For instance, an authentication server hosts or is in communication with a database having authentication information for users of a mobile network. A "user account" may include several attributes for a particular user, including a unique identifier of the mobile device(s) owned by the user, relationships with other users, call data records, bank account information, etc. A billing server may host a user account for the user to which value is added or removed based on the user's usage of services. One of these services includes mobile payment. In exemplary mobile payment systems, a user account hosted at a billing server is debited or credited based upon transactions performed by a user using their mobile device as a payment method.

For the following description, it can be assumed that most correspondingly labeled elements across the figures (e.g., 105 and 205, etc.) possess the same characteristics and are subject to the same structure and function. If there is a difference between correspondingly labeled elements that is not pointed out, and this difference results in a non-corresponding structure or function of an element for a particular embodiment, example or aspect, then the conflicting description given for that particular embodiment, example or aspect shall govern.

Figure 1A:
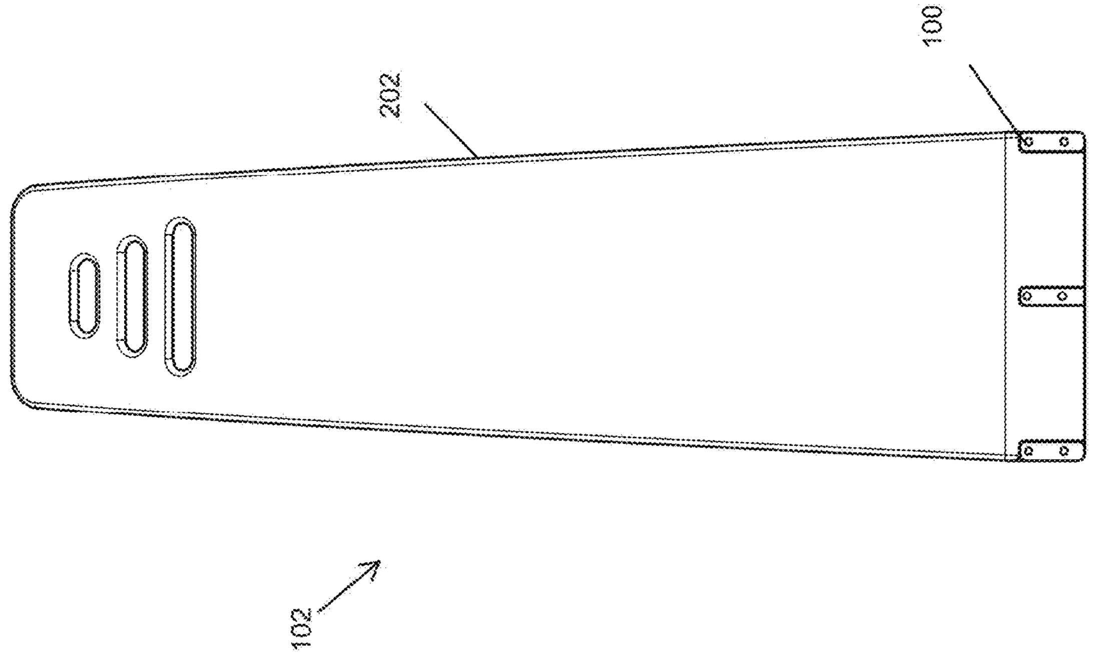

FIGS. 1A-1B depict a front view and a rear view, respectively, of a speaker assembly 102, according to an aspect. The speaker assemblies disclosed herein include a base 100, a glass membrane 202, and four transducers. Within the base 100, four transducers can be arranged: 101*a*, 101*b*, 101*c*, and 101*d* when viewed from the front side and in the sequence of 101*d*, 101*c*, 101*b*, 101*a* when viewed from the rear side as shown in FIG. 1B. Generally, this can be referred to as a quad transducer assembly.

Disclosed herein are speaker systems having a quad transducer assembly. The quad transducer assembly is designed to support each transducer such that the transducer's weight is supported equally in 360 degrees. Thus, the transducers can move freely without any tension from any side, such that there is no negative impact on audio generation for delivering high fidelity audio to the glass.

The speaker systems disclosed herein may be configured with four output channels from an amplifier, with four equalizers to set the EQ parameter for each one independently, which can create a richer, high-fidelity sound.

Figure 2B:
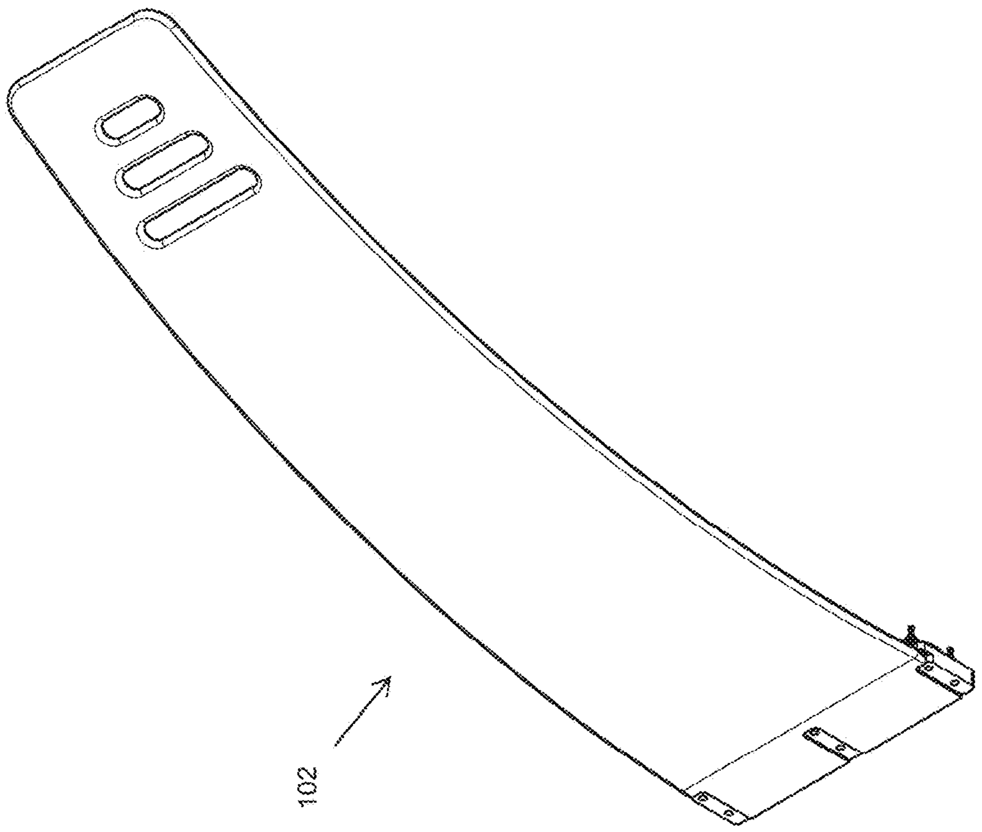
FIGS. 2A-2B depict a side perspective view and a front perspective view, respectively, of a speaker assembly, according to an aspect.
Figure 2A:
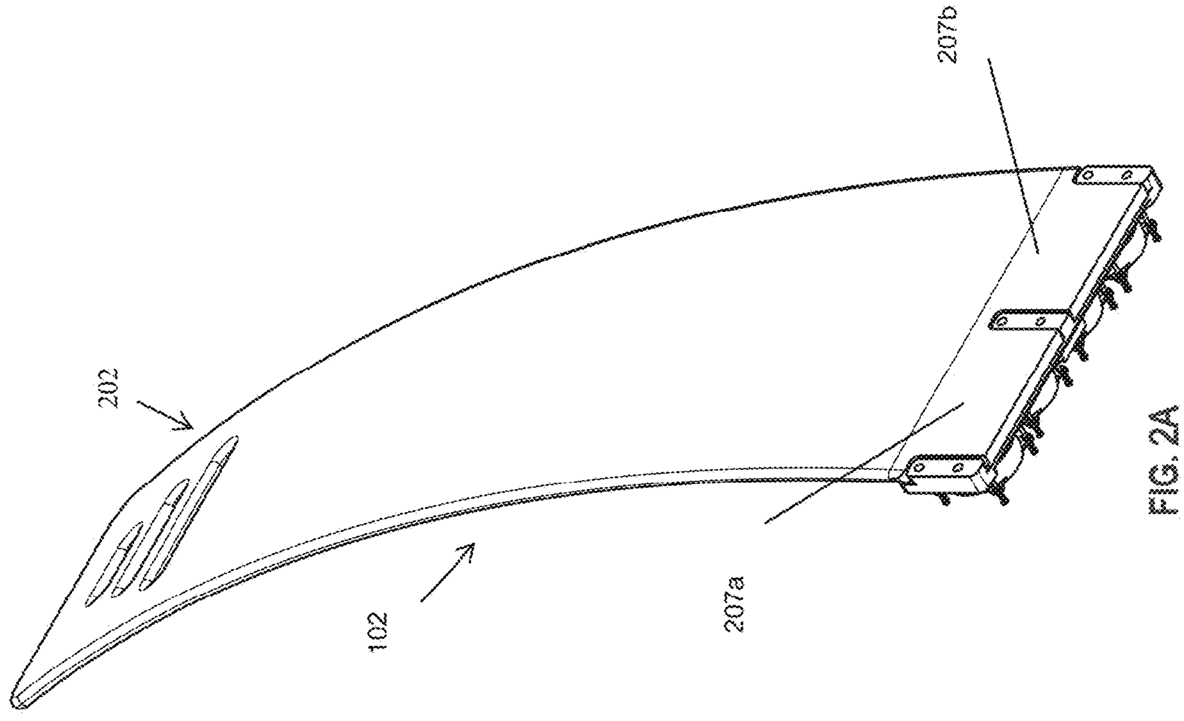

FIGS. 2A-2B depict a side perspective view and a front perspective view, respectively, of a speaker assembly 102, according to an aspect.

The speakers disclosed herein may include a planar membrane 202 which generally is constructed from glass, wherein the membrane 202 extends upwards from the base 100. Generally, the base 100 is configured to allow the membrane 202 to extend vertically from the base, relative to the floor.

The speaker systems disclosed herein may comprise bottom feet (not shown) on the base, for example. In some embodiments, the bottom feet are made of thick, medium soft silicone, in the shape of a ring, to prevent the transfer of vibration to the floor and the surrounding environment.

The speaker systems disclosed herein may comprise glass, wherein the composite material of the glass is different from standard, conventional glass. A very low-iron glass can be implemented for audio delivery. Generally, regular glass contains iron, which causes a frequency response echo with a high pitch due to the higher amount of iron in the glass, and the result is an unnatural sound which becomes more obvious when listening to vocal audio.

Figure 3:
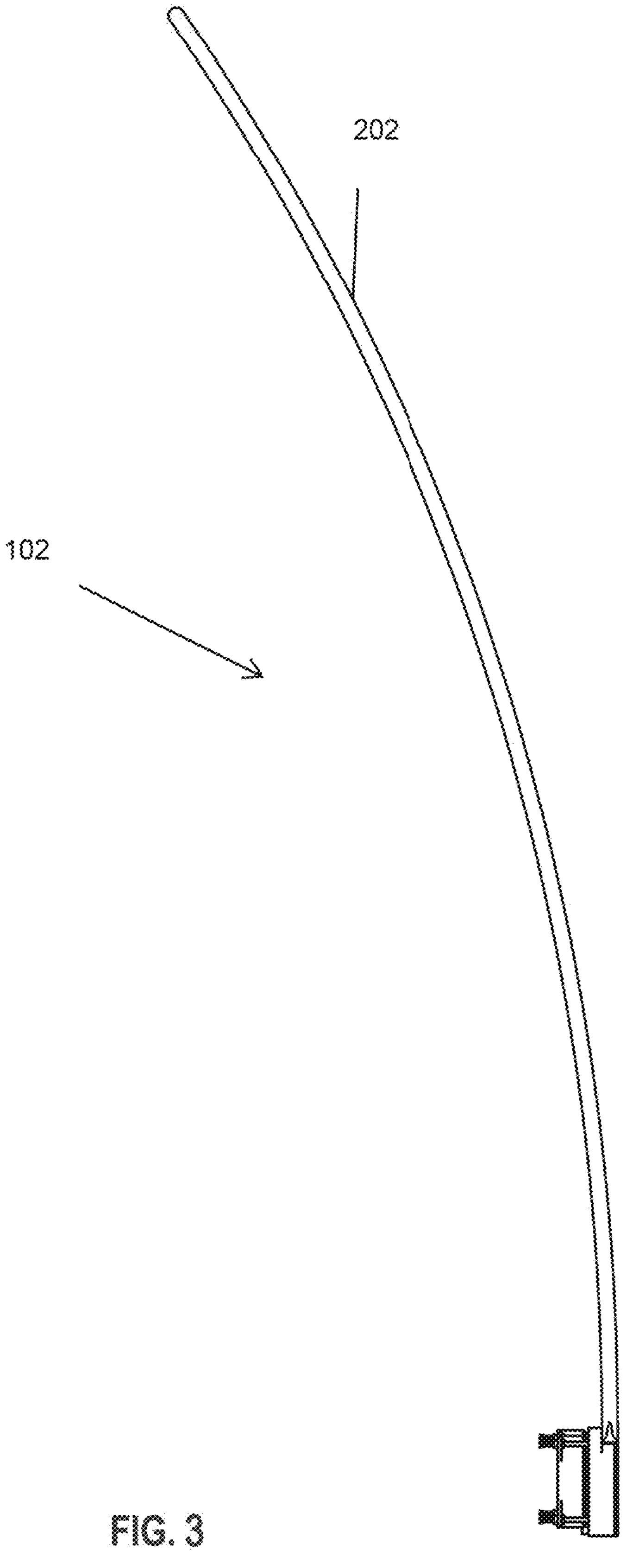
FIG. 3 depicts a side view of a speaker assembly, according to an aspect.

FIG. 3 depicts a side view of a speaker assembly 102, according to an aspect. The speaker systems disclosed herein may comprise glass, wherein the shape of the glass is curved. In some embodiments, the curved shape produces sound reflection from surrounding walls and ceiling.

Figure 4:
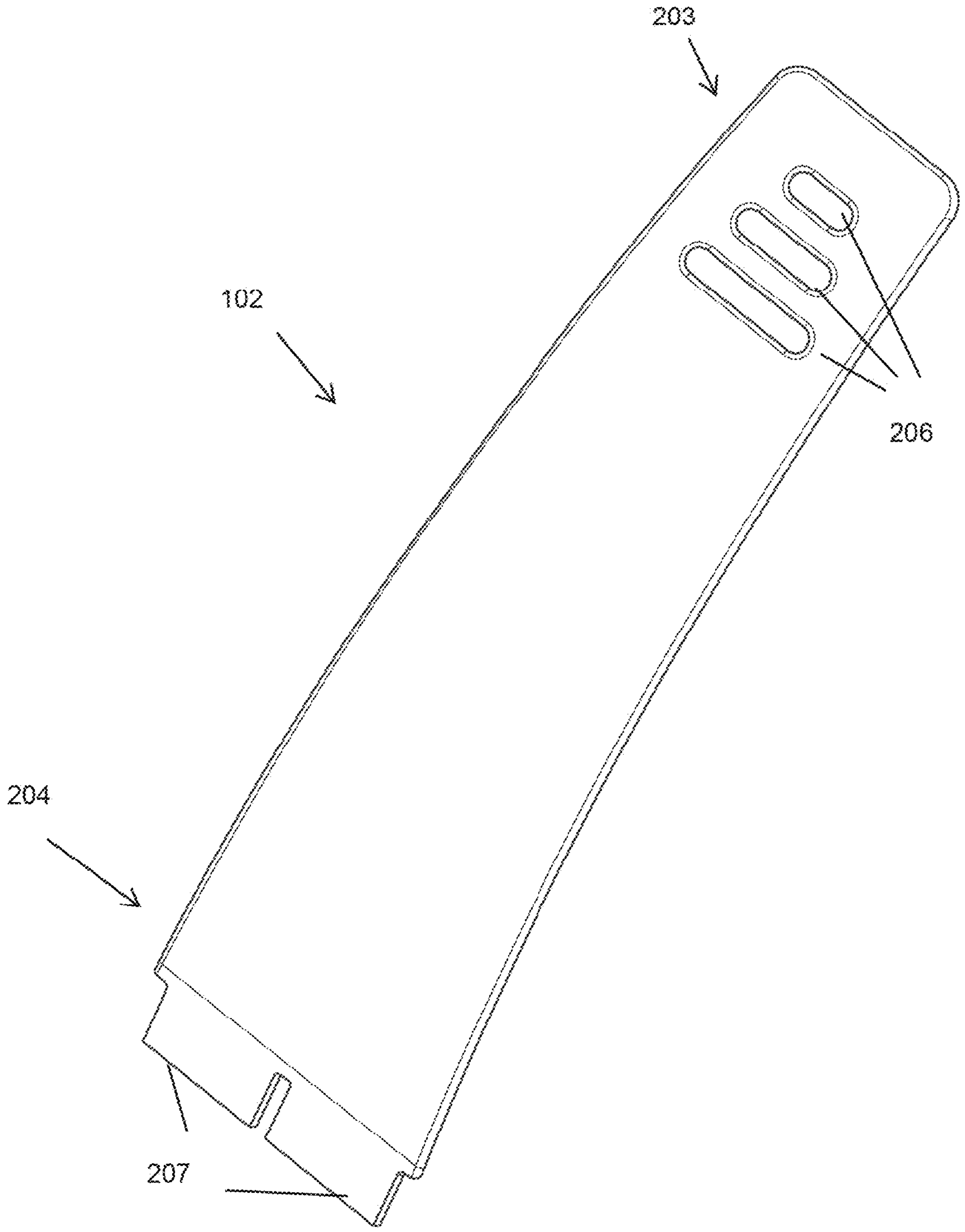
FIG. 4 depicts a side perspective view of a glass membrane, according to an aspect.

FIG. 4 depicts a side perspective view of a glass membrane 202, according to an aspect. The glass membrane 202 is shown in FIG. 3 not associated with a base, for visual clarity.

In some embodiments, the membrane 202 can include two slats 207 at the bottom end 204 for associating with the base (as shown in at least FIG. 1). Generally, the two slats 207 may be positioned such that they are spaced apart. In some embodiments, the membrane 202 can include a plurality of cutouts 206 at the top end. In some embodiments, the glass membrane is provided with three cutouts. In some embodiments, the three cutouts each have a different length.

The glass membranes disclosed herein may comprise a shape wherein the top end 203 of the membrane is smaller or narrower in width than a bottom end 204 of the membrane. The membrane can be provided with a curved shape. For example, the top end 203 of the membrane can curve away from the bottom end 204 at which the two slats 207 are provided for attaching the membrane to the base.

Figure 5:
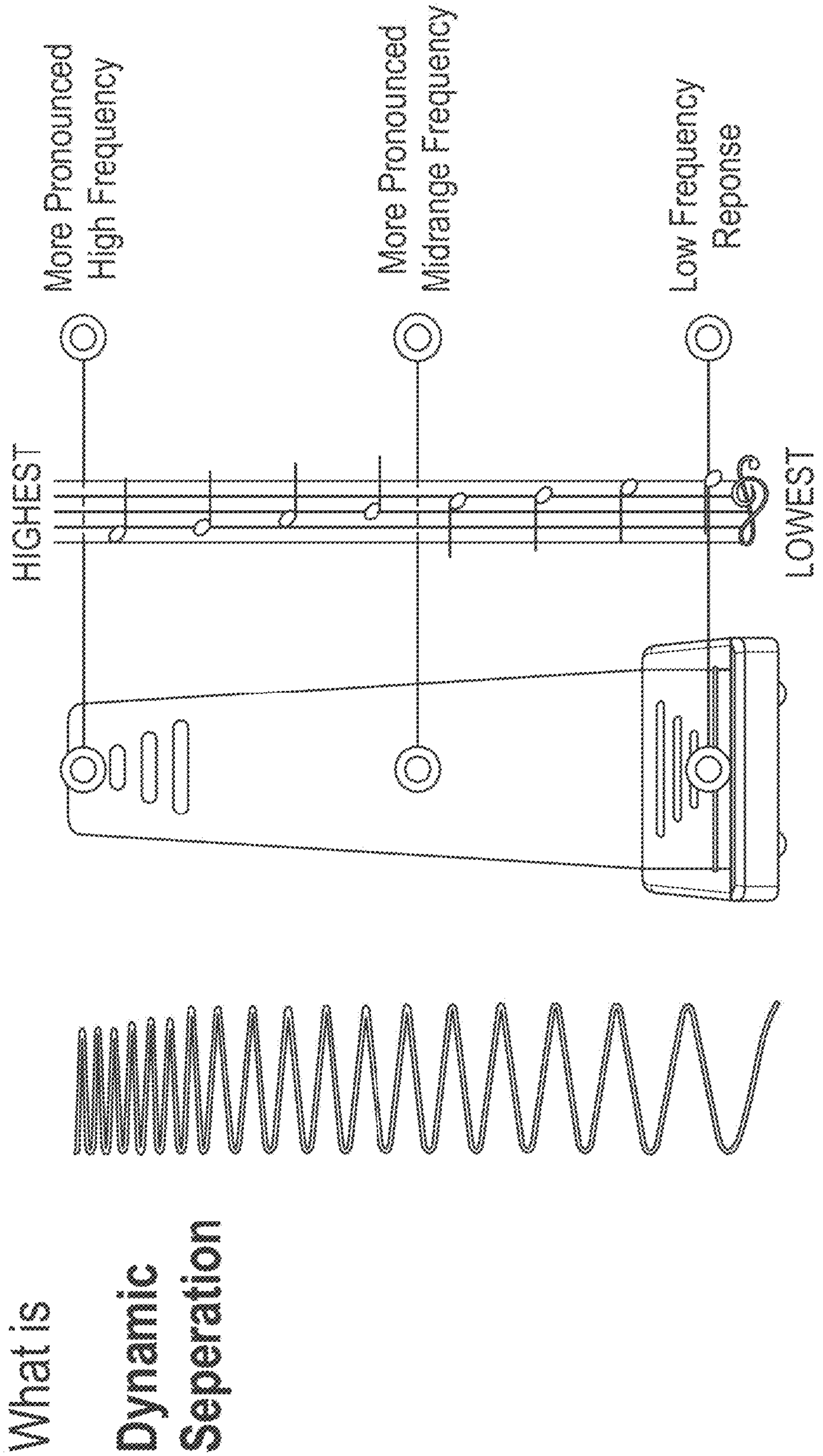
FIG. 5 is a schematic diagram showing an exemplary speaker as disclosed herein, and showing an example of the different frequencies produced by the speaker, according to an aspect.

FIG. 5 is a schematic diagram showing an exemplary speaker 505 as disclosed herein, and showing an example of the different frequencies produced by the speaker, according to an aspect. Generally, more pronounced, high frequencies resonate more at the top end of the glass, more pronounced mid-range frequencies resonate more at the middle of the glass, and low frequency response occur at the bottom of the glass.

Again as discussed above, the top end 203 of the membrane is smaller or narrower in width than a bottom end 204 of the membrane. Generally, this means that the amount of glass mass is heavier at the base on the bottom end 204 and becomes gradually lighter towards the top end 203. The mass at the top end can be further reduced by the three cutouts 206. Thus, the frequency responses will follow the amount of glass mass accordingly. As a user listens to a song, for example, that has different instruments such as drums, piano, guitar, bass guitar, flute, and vocals, each instrument and vocals will resonate more prominently at different parts of the glass. As an example, drums and bass guitar will resonate more at the bottom end of the membrane, piano will be more prominent in the middle portion and top part of the glass, and guitar and flute will resonate more prominently from the top part of the glass.

Figure 6:
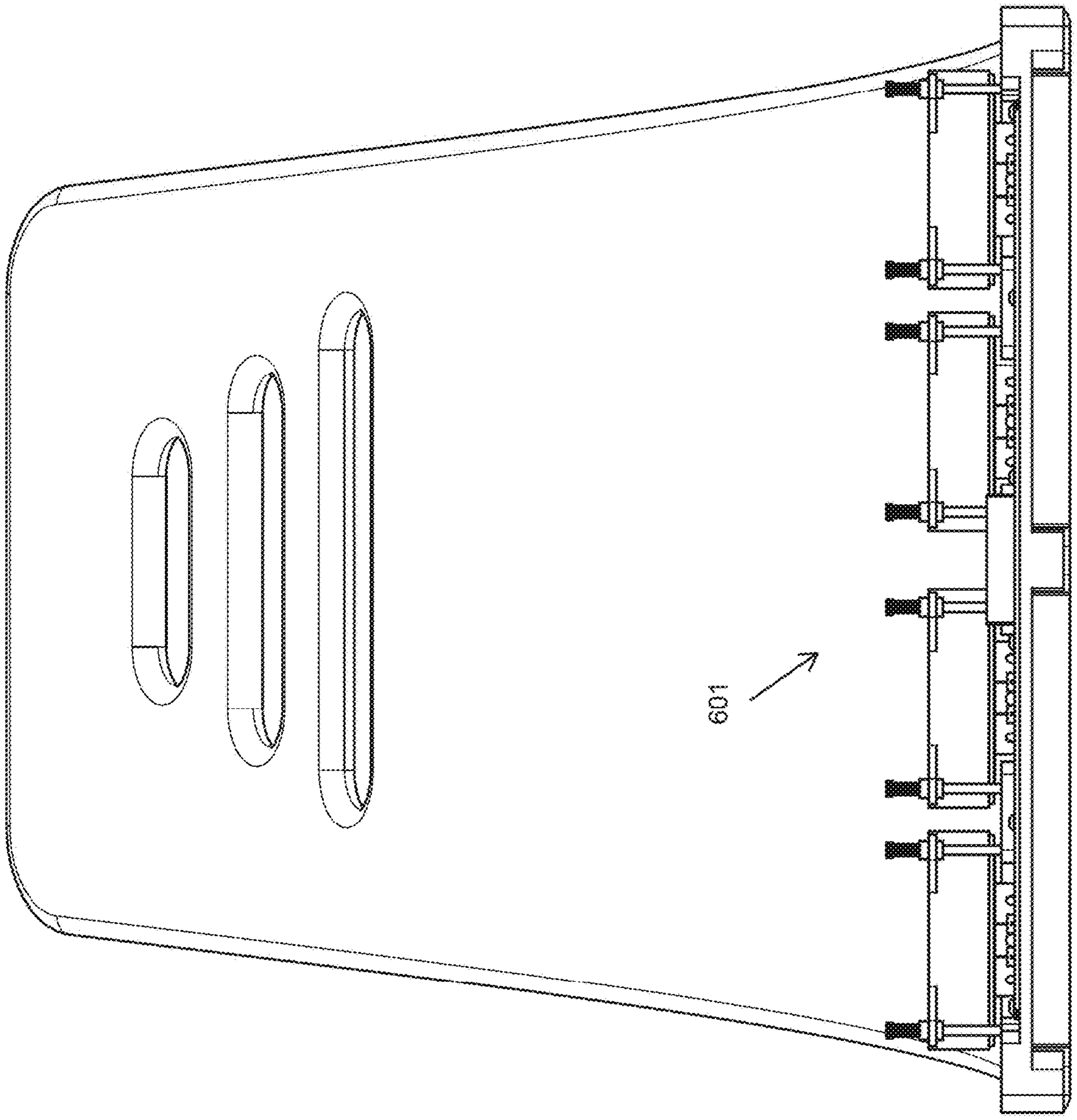
FIG. 6 depicts a rear perspective view of a speaker assembly showing the quad transducer assembly, according to an aspect.

FIG. 6 depicts a rear perspective view of a speaker assembly showing the quad transducer assembly 601, according to an aspect.

Figure 7:
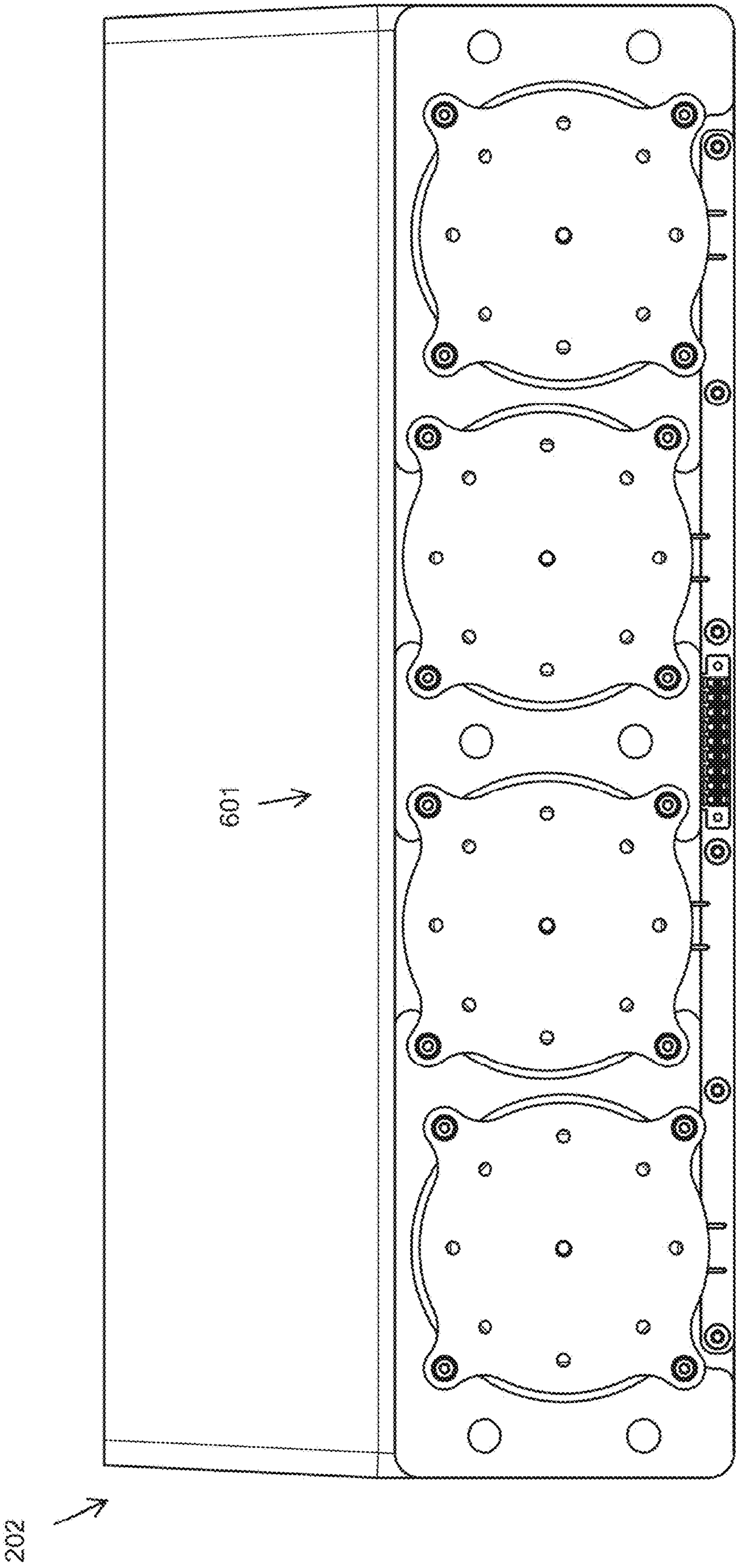
FIG. 7 depicts a top view of a quad transducer assembly which can be used for any of the speakers disclosed herein, according to an aspect.

FIG. 7 depicts a top view of a quad transducer assembly which can be used for any of the speakers disclosed herein, according to an aspect. A partial view is shown in FIG. 7 wherein only a partial view of the membrane 202 is shown for visual clarity.

Figure 8:
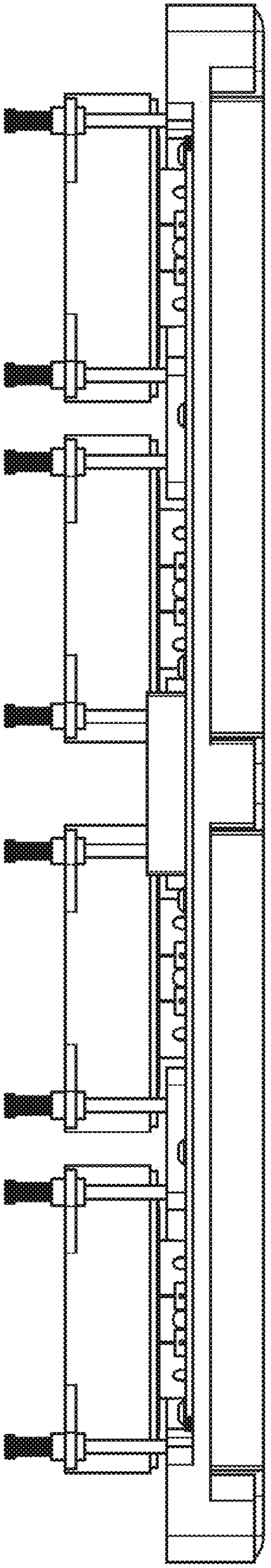
FIG. 8 depicts a bottom view of a quad transducer assembly which can be used for any of the speakers disclosed herein, according to an aspect.

FIG. 8 depicts a bottom view of a quad transducer assembly which can be used for any of the speakers disclosed herein, according to an aspect.

Figure 9:
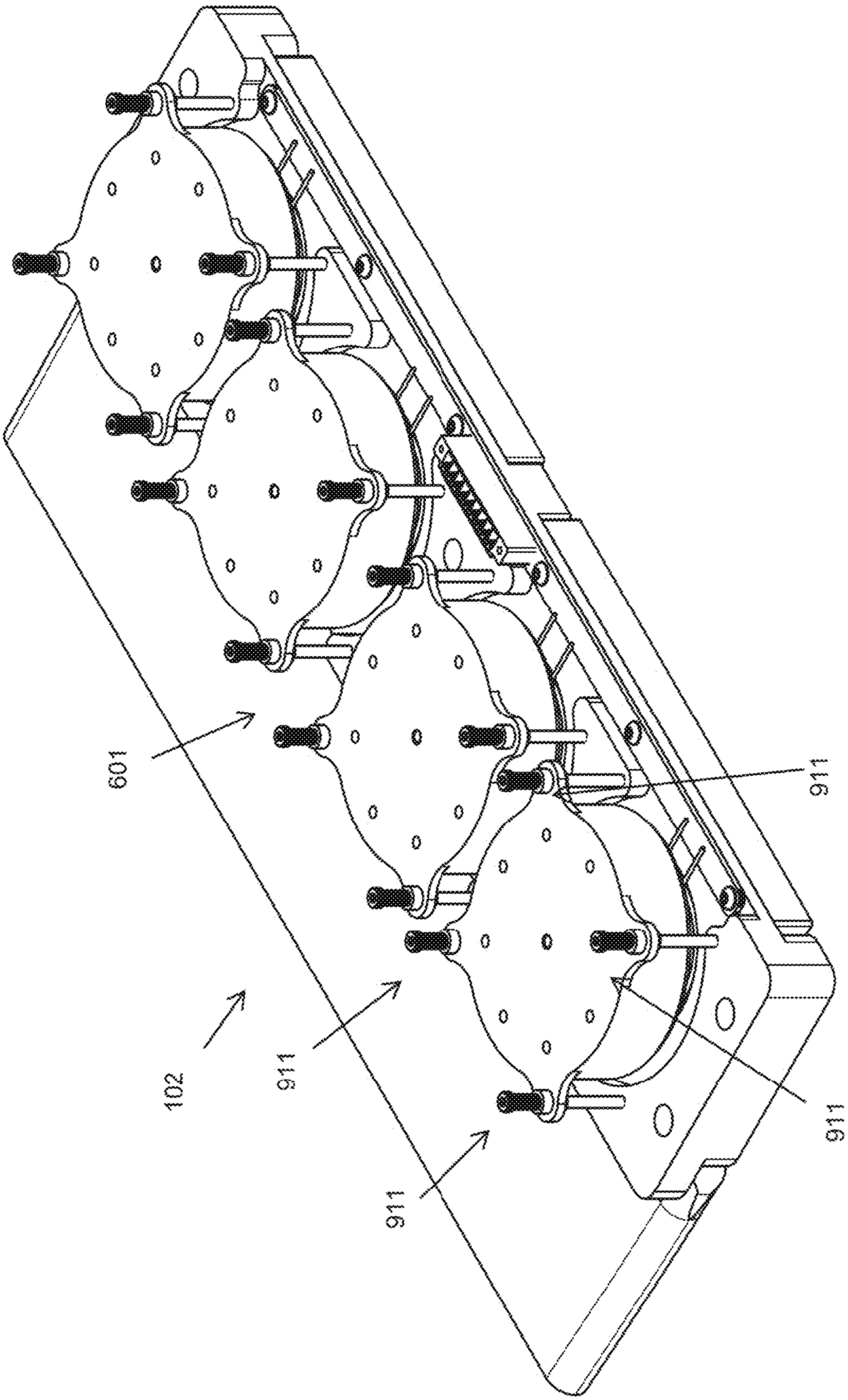
FIG. 9 depicts a rear perspective view of a quad transducer assembly for use with any of the speakers disclosed herein, according to an aspect.

FIG. 9 depicts a rear perspective view of a quad transducer assembly 601 for use with any of the speakers disclosed herein, according to an aspect. The glass membrane 202 is shown as a partial view for visual clarity. Each transducer can be provided with springs 911. In some embodiments, each transducer is provided with four springs 911.

Figure 10:
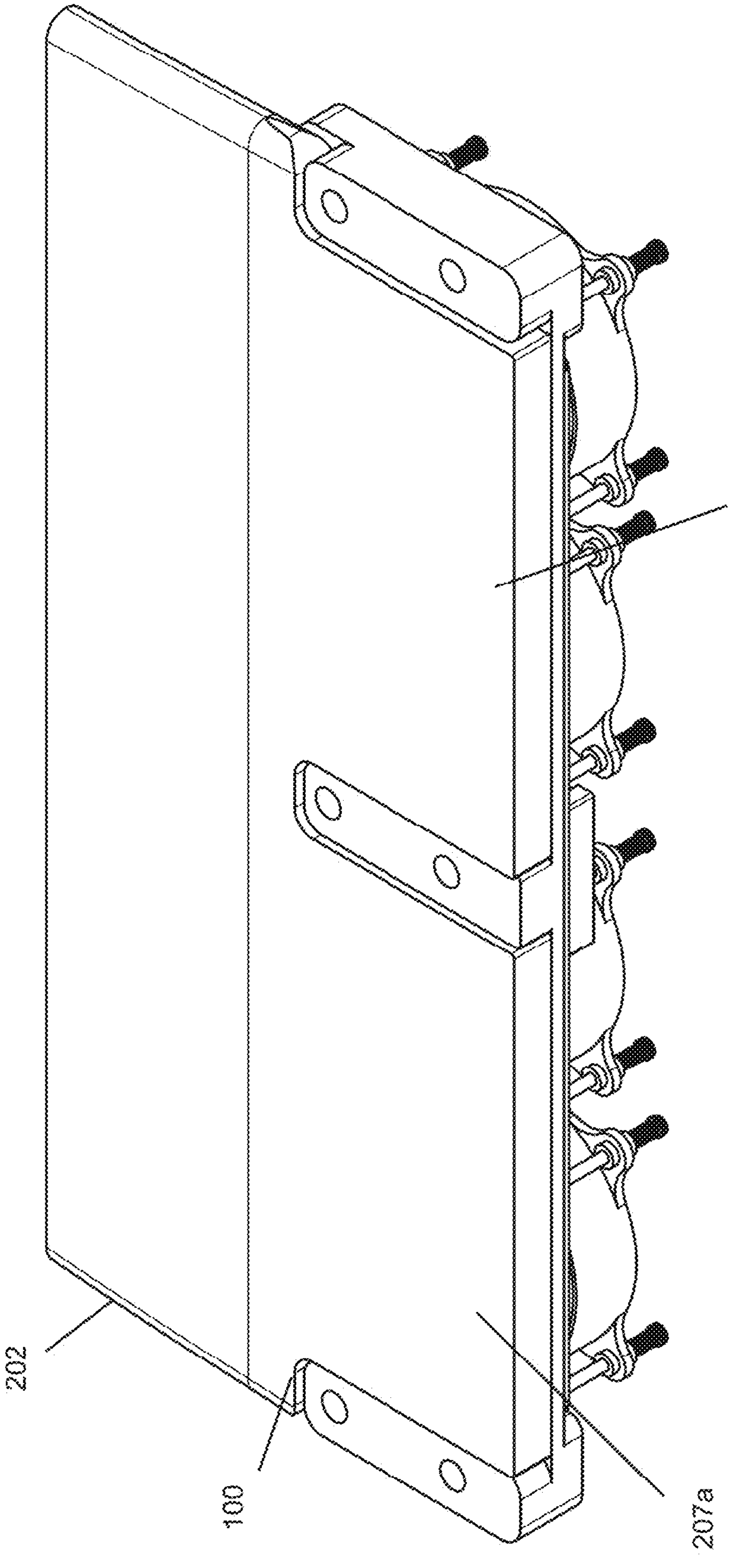
FIG. 10 depicts a partial front view of the base for use with any of the speakers disclosed herein, according to an aspect.

FIG. 10 depicts a partial front view of the base 100 for use with any of the speakers disclosed herein, according to an aspect. The glass membrane 202 is shown as a partial view for visual clarity and portions of the glass membrane are fitted onto the front of the base.

Figure 11:
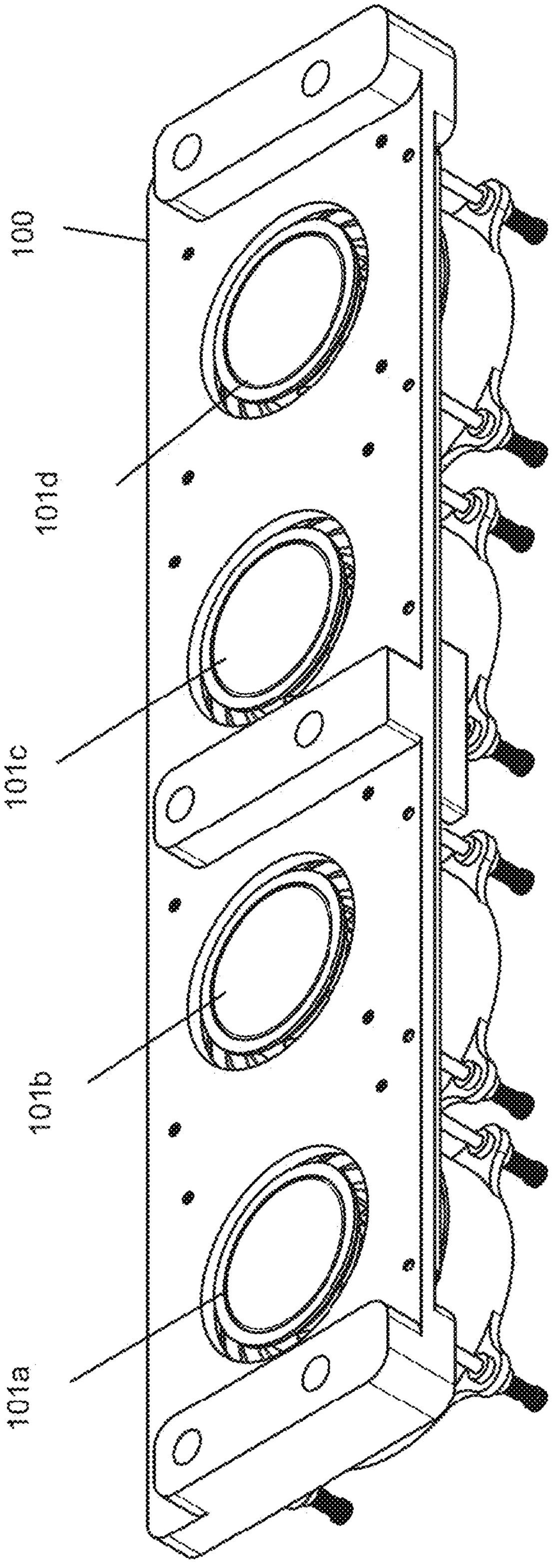
FIG. 11 depicts a front perspective view of a base having a quad transducer assembly, according to an aspect.

FIG. 11 depicts a front perspective view of a base 100 having a quad transducer assembly, according to an aspect. Generally, the transducers are each fitted into the base 100 such that they can be bonded to the glass membrane which is shaped to fit onto the base 100 over the transducers. Referring to FIGS. 2A and 10, slat section 207*a* is shaped to fit over transducers 101*a* and 101*b*, and slat section 207*b* is shaped to fit over transducers 101*c* and 101*d*, and each of the transducers can then be bonded to the glass.

As an example, four transducers can be included, wherein two transducers are copper and two transducers are aluminum. In some embodiments, the transducers are arranged such that transducers of different materials are next to each other. In some embodiments, the transducers are arranged such that a copper transducer 101*a* is leftmost, followed by an aluminum transducer 101*b*, followed by a copper transducer 101*c*, followed by a rightmost transducer which is an aluminum transducer 101*d*. In some embodiments, the sequence is aluminum, copper, aluminum, and copper. In such embodiments, the transducers are bonded to the surface of the glass membrane at the bottom edge of the glass as discussed above.

In such embodiments, this combination of materials and sequence of materials can create more natural depth in, for example, vocal audio that resonates from the surface of the glass. This can result in an improved and better audio quality than can be produced from a single transducer made with aluminum contacts, which provide lower accuracy in terms of frequency responses.

Generally, each of the transducers of the quad transducer assembly are positioned at 90 degrees to the surface of the glass, generally for free up-and-down movement of the four transducers. In some embodiments, the assembly includes the main frame, and shoulder screws with springs that hold each driver to the main assembly, while still allowing freedom of movement as audio signals are sent to each transducer.

Figure 12:
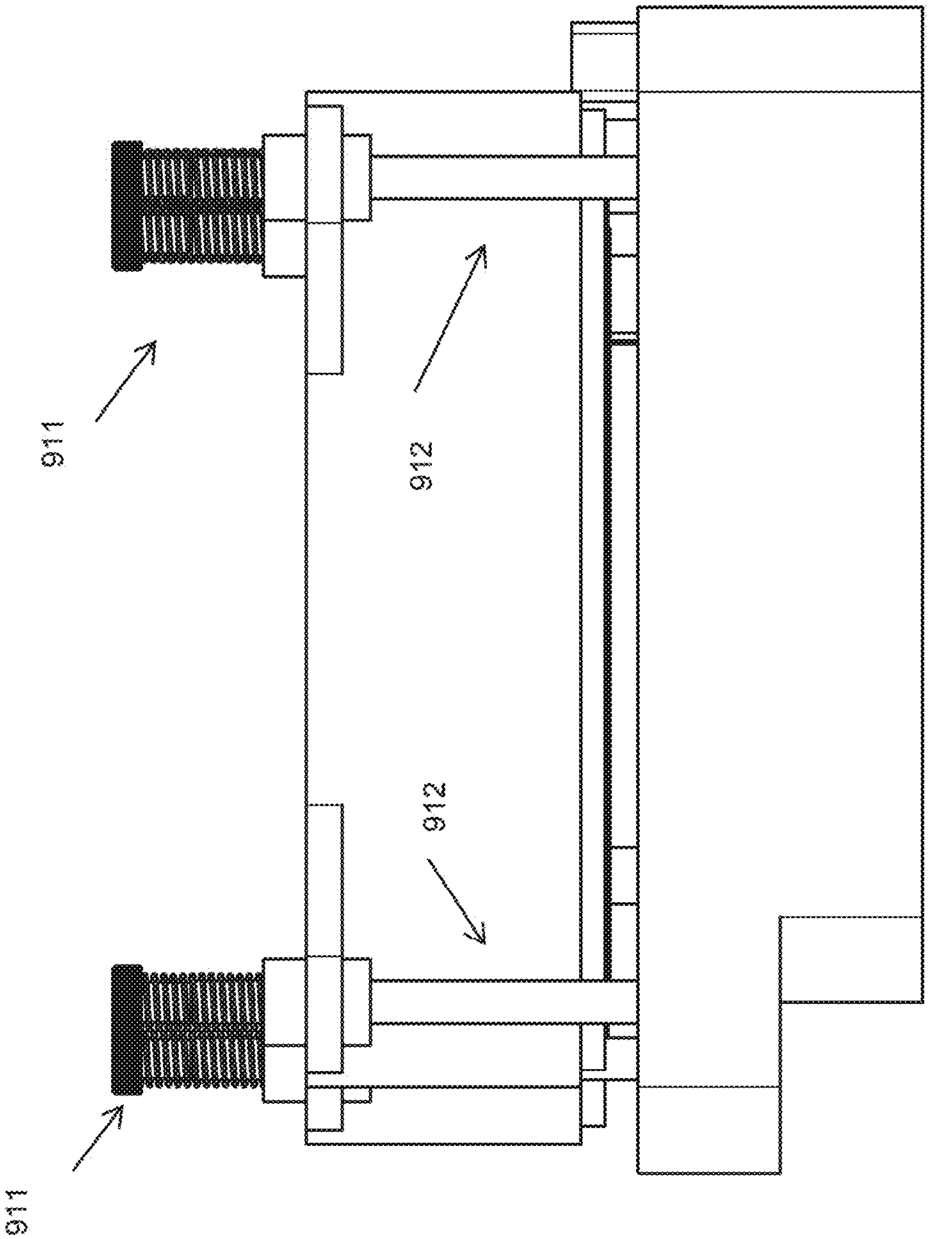
FIG. 12 depicts a side elevation view of a single transducer that can be used within a quad transducer assembly of any of the speakers disclosed herein, according to an aspect.

FIG. 12 depicts a side elevation view of a single transducer that can be used within a quad transducer assembly of any of the speakers disclosed herein, according to an aspect. Two springs 911 are visible in the side elevation view depicted. It should be understood that each transducer may be provided with four springs, with one spring on each corner of the generally square or rectangular transducer, as depicted in FIG. 9. Each spring 911 can be positioned and provided to support each individual transducer around all axes. Each spring 911 can be provided with a shoulder screw 912, which is used in conjunction with each spring to help support the transducer. It should generally be understood that each transducer of a quad transducer assembly can be provided with four springs 911, each spring being associated with its own shoulder screw 912, for even support all around the transducer.

Generally, disclosed herein is a speaker assembly, comprising a curved, low-iron glass, a quad transducer assembly operatively interfacing with the glass and configured to support each transducer of the quad transducer assembly, wherein the weight of each transducer is supported equally on 360 degrees, such that the transducers are moving freely without any tension from any side, and wherein the speaker assembly comprises a plurality of addressable LEDs that operatively interface with the glass.

Figure 13B:
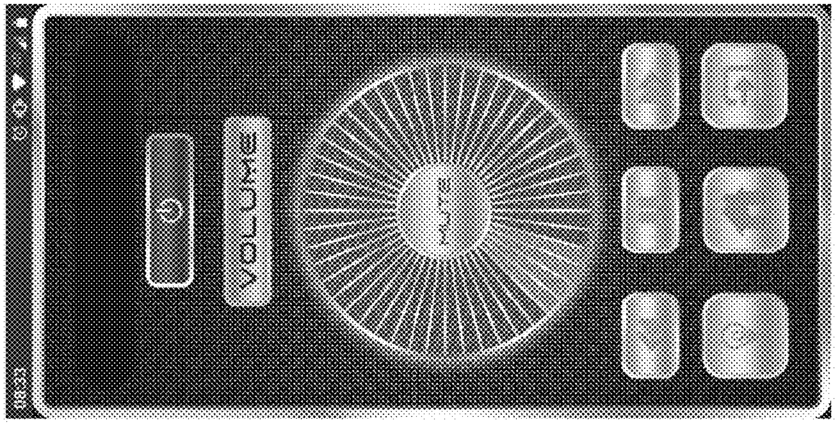
FIG. 13A-13B depict exemplary screen views for a mobile or web-based application that can be used to control any of the speakers disclosed herein, according to an aspect.
Figure 13A:
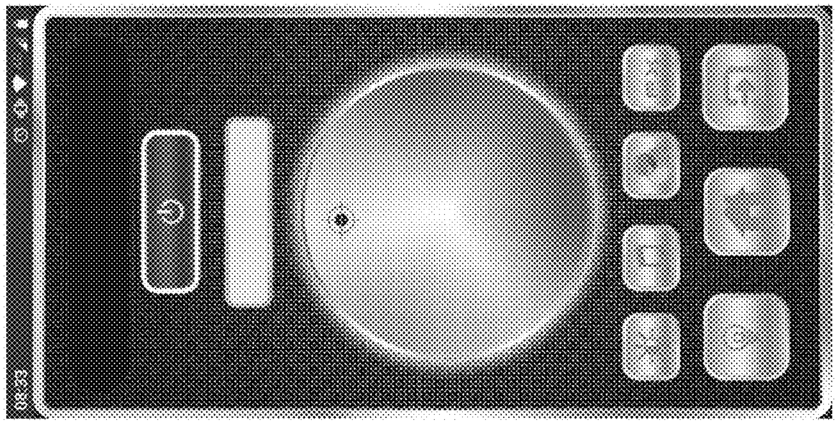

FIG. 13A-13B depict exemplary screen views for a mobile or web-based application that can be used to control any of the speakers disclosed herein, according to an aspect.

The speaker systems disclosed herein may be paired with a transmitter hub to broadcast the audio signal to the speakers. The transmitter processes the audio to transmit accordingly to the right, the left, and the subwoofer speaker. The transmitter hub is also controlled via a dedicated app.

The speaker systems disclosed herein may comprise LEDs that have been implemented and are addressable for creating unique effects. In some embodiments, each LED can be controlled individually.

The speaker systems disclosed herein may comprise wireless speakers. In some embodiments, the wireless speakers are integrated with the hardware and firmware to be controlled via a dedicated app that allows a user to control the audio and LED lights. In some embodiments, the app allows a user to select inputs, adjust volume, mute, and select LED special effects. In some embodiments, about 20 different effects are loaded in the preset buttons.

The speaker systems disclosed herein may comprise an interface connection on a plate underneath the speaker housing to adjust and upload EQ parameters, as well as uploading LED controller parameters, which can be modified for new light effects.

It may be advantageous to set forth definitions of certain words and phrases used in this patent document. The term "couple" and its derivatives refer to any direct or indirect communication between two or more elements, whether or not those elements are in physical contact with one another. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Further, as used in this application, "plurality" means two or more. A "set" of items may include one or more of such items. Whether in the written description or the claims, the terms "comprising," "including," "carrying," "having," "containing," "involving," and the like are to be understood to be open-ended, i.e., to mean including but not limited to. Only the transitional phrases "consisting of" and "consisting essentially of," respectively, are closed or semi-closed transitional phrases with respect to claims.

If present, use of ordinal terms such as "first," "second," "third," etc., in the claims to modify a claim element does not by itself connote any priority, precedence or order of one claim element over another or the temporal order in which acts of a method are performed. These terms are used merely as labels to distinguish one claim element having a certain name from another element having a same name (but for use of the ordinal term) to distinguish the claim elements. As used in this application, "and/or" means that the listed items are alternatives, but the alternatives also include any combination of the listed items.

Throughout this description, the aspects, embodiments or examples shown should be considered as exemplars, rather than limitations on the apparatus or procedures disclosed or claimed. Although some of the examples may involve specific combinations of method acts or system elements, it should be understood that those acts and those elements may be combined in other ways to accomplish the same objectives.

Acts, elements and features discussed only in connection with one aspect, embodiment or example are not intended to be excluded from a similar role(s) in other aspects, embodiments or examples.

Aspects, embodiments or examples of the invention may be described as processes, which are usually depicted using a flowchart, a flow diagram, a structure diagram, or a block diagram. Although a flowchart may depict the operations as a sequential process, many of the operations can be performed in parallel or concurrently. In addition, the order of the operations may be re-arranged. With regard to flowcharts, it should be understood that additional and fewer steps may be taken, and the steps as shown may be combined or further refined to achieve the described methods.

If means-plus-function limitations are recited in the claims, the means are not intended to be limited to the means disclosed in this application for performing the recited function, but are intended to cover in scope any equivalent means, known now or later developed, for performing the recited function.

Claim limitations should be construed as means-plus-function limitations only if the claim recites the term "means" in association with a recited function.

If any presented, the claims directed to a method and/or process should not be limited to the performance of their steps in the order written, and one skilled in the art can readily appreciate that the sequences may be varied and still remain within the spirit and scope of the present invention.

Although aspects, embodiments and/or examples have been illustrated and described herein, someone of ordinary skills in the art will easily detect alternate of the same and/or equivalent variations, which may be capable of achieving the same results, and which may be substituted for the aspects, embodiments and/or examples illustrated and described herein, without departing from the scope of the invention. Therefore, the scope of this application is intended to cover such alternate aspects, embodiments and/or examples. Hence, the scope of the invention is defined by the accompanying claims and their equivalents. Further, each and every claim is incorporated as further disclosure into the specification.

What is claimed is:

1. A speaker assembly, comprising:

a front side;

a rear side;

a base configured to house a quad transducer assembly;

a glass membrane configured to fit on the base and extend vertically from the base, wherein the glass membrane comprises:

a low-iron glass material;

a curved shape;

a top glass end;

a bottom glass end; and a plurality of cutouts at the top end, wherein each cutout comprises a different length from each other cutout;

a first slat and a second slat at the bottom glass end;

wherein a width of the glass membrane gradually narrows from the bottom end to the top end such that the top end is narrower than the bottom end;

the quad transducer assembly comprising:

four transducers arranged horizontally in a sequence when viewed from the front side of a first copper transducer, a first aluminum transducer, a second copper transducer, and a second aluminum transducer;

wherein each transducer is evenly supported within the housing such that each transducer can move freely; and wherein the first slat and the second slat are configured to fit over the base at the front side of the speaker assembly such that the first slat fits over and is bonded to the first copper transducer and the first aluminum transducer, and the second slat fits over and is bonded to the second copper transducer and the second aluminum transducer.

2. The speaker assembly of claim 1, wherein the curved shape is configured such that the top glass end curves away from the front side of the speaker assembly.

3. The speaker assembly of claim 1, wherein the plurality of cutouts comprises three cutouts.

4. The speaker assembly of claim 1, wherein the glass membrane is configured to allow audio having different frequencies to resonate at different sections of the glass membrane.

5. The speaker assembly of claim 1, wherein each transducer of the quad transducer assembly is arranged at 90 degrees with respect to the glass membrane.

6. A speaker assembly, comprising:

a front side;

a rear side;

a base configured to house a quad transducer assembly;

a glass membrane configured to fit on the base and extend vertically from the base, wherein the glass membrane comprises:

a curved shape;

a top end;

a bottom end; and a plurality of cutouts at the top end;

wherein a width of the glass membrane gradually narrows from the bottom end to the top end such that the top end is narrower than the bottom end;

the quad transducer assembly comprising:

four transducers arranged horizontally in a sequence when viewed from the front side of a first copper transducer, a first aluminum transducer, a second copper transducer, and a second aluminum transducer;

wherein each transducer is evenly supported within the housing such that each transducer can move freely.

7. The speaker assembly of claim 6, wherein the curved shape is configured such that the top glass end curves away from the front side of the speaker assembly.

8. The speaker assembly of claim 6, wherein the plurality of cutouts comprises three cutouts.

9. The speaker assembly of claim 6, wherein the glass membrane is configured to allow audio having different frequencies to resonate at different sections of the glass membrane.

10. The speaker assembly of claim 6, wherein the glass membrane comprises a first slat and a second slat the bottom glass end, wherein the first slat and the second slat are each shaped to be positioned over the base at the front side of the speaker assembly.

11. The speaker assembly of claim 6, wherein a mass of the glass membrane at the top glass end is less than a second mass of the glass membrane the bottom glass end.

12. The speaker assembly of claim 8, wherein each of the cutouts comprises a different length from each one of the other three cutouts.

13. A speaker assembly, comprising:

a front side;

a rear side;

a base configured to house a quad transducer assembly;

a glass membrane configured to fit on the base and extend vertically from the base, wherein the glass membrane comprises:

a curved shape;

a top end;

a bottom end; and a plurality of cutouts at the top end;

wherein a width of the glass membrane gradually narrows from the bottom end to the top end such that the top end is narrower than the bottom end;

the quad transducer assembly comprising:

four transducers comprising at least two different materials such that a first transducer and a second transducer comprise a first material, and a third transducer and a fourth transducer comprise a second material;

wherein the four transducers are arranged horizontally such that the first transducer is next to the third transducer, followed by the second transducer, followed by the fourth transducer, when viewed from the front side of the speaker assembly;

wherein each transducer is evenly supported within the housing such that each transducer can move freely.

14. The speaker assembly of claim 13, wherein the first material is copper.

15. The speaker assembly of claim 13, wherein the second material is aluminum.

16. The speaker assembly of claim 13, wherein the four transducers are arranged horizontally in a sequence when viewed from the front side of a first copper transducer, a first aluminum transducer, a second copper transducer, and a second aluminum transducer.

17. The speaker assembly of claim 13, wherein the curved shape is configured such that the top glass end curves away from the front side of the speaker assembly.

18. The speaker assembly of claim 13, wherein the glass membrane is configured to allow audio having different frequencies to resonate at different sections of the glass membrane.

19. The speaker assembly of claim 13, wherein the glass membrane comprises a first slat and a second slat the bottom glass end, wherein the first slat and the second slat are each shaped to be positioned over the base at the front side of the speaker assembly.

20. The speaker assembly of claim 19, wherein the first slat is bonded to the first transducer and the third transducer and the second slat is bonded to the second transducer and the fourth transducer.

* * * * *